(12) United States Patent
Beneventi et al.

(10) Patent No.: US 7,503,273 B2
(45) Date of Patent: Mar. 17, 2009

(54) METHOD FOR THE MANUFACTURE OF A DRY REINFORCING PREFORM FOR A COMPOSITE STRUCTURAL MEMBER OF AN AIRCRAFT

(75) Inventors: Francesco Beneventi, Foggia (IT); Vincenzo De Vita, Andria (IT); Sabato Inserra Imparato, Gragnano (IT)

(73) Assignee: Alenia Aeronautica S.p.A. (IT)

( * ) Notice: Subject to any disclaimer, the term of this patent is extended or adjusted under 35 U.S.C. 154(b) by 485 days.

(21) Appl. No.: 11/084,960

(22) Filed: Mar. 21, 2005

(65) Prior Publication Data

US 2005/0268832 A1    Dec. 8, 2005

(30) Foreign Application Priority Data

Mar. 23, 2004    (IT) .......................... TO2004A0198

(51) Int. Cl.
*D05B 3/12* (2006.01)
(52) U.S. Cl. .................................. 112/475.04; 112/440
(58) Field of Classification Search ............ 112/470.12, 112/475.04, 475.08, 475.18, 428, 440
See application file for complete search history.

(56) References Cited

U.S. PATENT DOCUMENTS

| 4,867,086 | A |   | 9/1989 | Vees et al. ............... 112/262.3 |
|---|---|---|---|---|
| 5,429,853 | A | * | 7/1995 | Darrieux ..................... 112/440 |
| 5,460,673 | A | * | 10/1995 | Cahuzac ..................... 112/428 |
| 5,543,005 | A | * | 8/1996 | Monget et al. .............. 112/412 |
| 6,123,043 | A | * | 9/2000 | Cahuzac ................ 112/475.08 |
| 6,645,333 | B2 | * | 11/2003 | Johnson et al. ............... 156/92 |

\* cited by examiner

*Primary Examiner*—Danny Worrell
(74) *Attorney, Agent, or Firm*—Cook Alex Ltd.

(57) ABSTRACT

For the manufacture of a dry preform intended for reinforcing a composite structural member of an aircraft, a digitally controlled automatic machine similar to an embroidery machine deposits and stitches successive layers of continuous reinforcing fibres. In each layer the fibres are oriented and distributed according to a predetermined scheme. A preform is obtained having a predetermined three-dimensional shape in which the reinforcing fibres are distributed and oriented an in optimum manner.

12 Claims, 2 Drawing Sheets

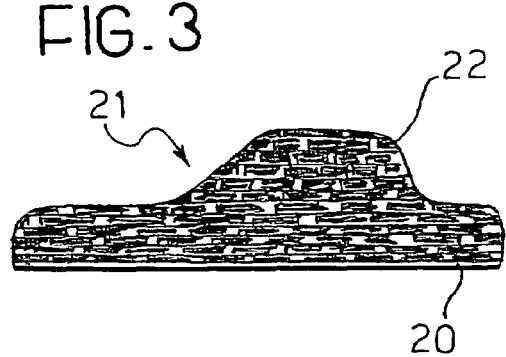
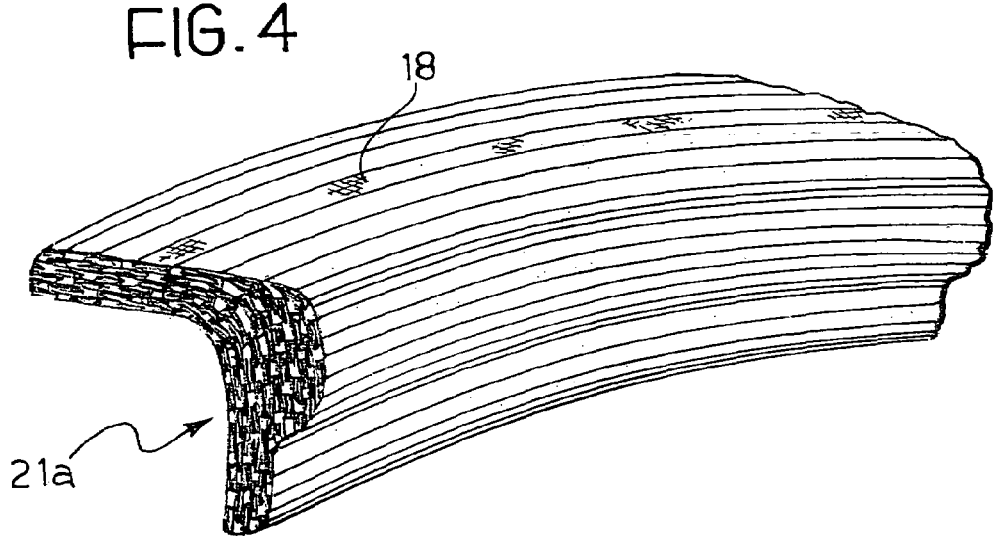
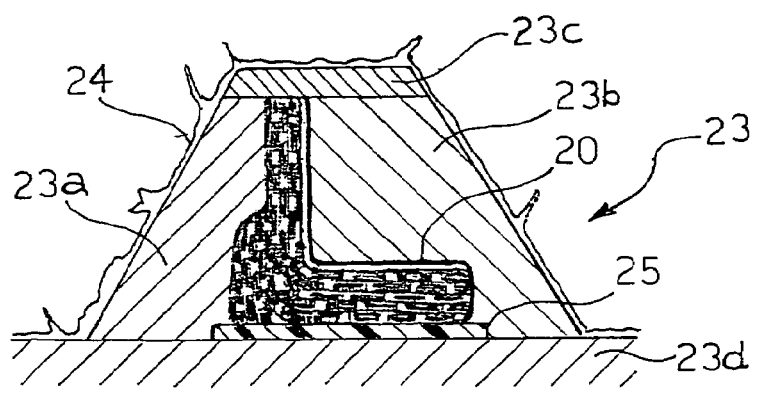

METHOD FOR THE MANUFACTURE OF A DRY REINFORCING PREFORM FOR A COMPOSITE STRUCTURAL MEMBER OF AN AIRCRAFT

FIELD OF THE INVENTION

The present invention relates to a method for the manufacture of a dry preform having a predetermined three-dimensional shape, wherein the preform is intended to reinforce a composite structural member of an aircraft and comprises continuous reinforcing fibres held together by a line of stitching.

BACKGROUND OF THE INVENTION

In the field of aircraft construction, composite structural members are widely used which have a matrix of thermosetting resin acting as a binder for elongate reinforcing elements. The reinforcing elements are customarily parallel tapes of continuous filaments (or tows) of carbon fibre that are held by a line of stitching so as to form sheets which are cut to size and placed, superposed, in a moulding fixture which is then covered with a vacuum bag and introduced into an autoclave, applying temperature and pressure such as to bring about the polymerization of a thermosetting resin. In some cases sheets of parallel carbon fibres pre-impregnated with resin are used. In other cases sheets that are not pre-impregnated are used, being superposed in the dry state on the moulding fixture, and in the vacuum bag a measured amount of resin is previously arranged which, in the autoclave, permeates the sheets of fibre and polymerizes. This latter technique is known in the art as resin film infusion or resin transfer moulding in the case where use is made of a closed fixture with resin injection for polymerization in an autoclave.

Both the above-mentioned methods give unsatisfactory results when the structural member has a complex three-dimensional shape, particularly when it has curvatures in two non-parallel planes. This is because in order to adapt the sheets to the curved moulding fixture on which they are superposed it is difficult, if not impossible, to arrange the carbon fibres, which are parallel and adjacent in each sheet, according to the course (curve) of the fixture. As a result, the fibres are not oriented according to the curvilinear development of the structural member, and therefore are not oriented according to the maximum stress to which the structural member will be subjected in practice. It is further necessary to avoid the sheets of fibres forming wrinkles or areas that are excessively stretched and thinned out, or that have slits, since this produces a discontinuity or interruption of the path of the stresses that the fibres must withstand in practice.

Some techniques have been proposed (curved braiding, overbraiding) which make it possible to obtain three-dimensional solids (termed "dry preforms" in the art) constituted by fibres with curvilinear or radial orientation, but these techniques are suitable only for producing components of constant thickness. Furthermore, the formation of a dry preform on a curved mandrel is disadvantageous, since the preform must be manipulated and transferred together with the mandrel, otherwise the shape imparted may be lost.

SUMMARY OF THE INVENTION

The object of the present invention is therefore to propose a method for the manufacture of dry preforms for the production of a structural member of the type specified above, by confronting in the main the problem of optimizing the orientation and distribution of the carbon fibres in dependence on the geometric characteristics of the structural member and on the path of the stresses that the latter must withstand in practice.

Other objects of the invention are to produce preforms having local thickenings, to fix the carbon fibres in such a way as to guarantee that the predetermined orientation is maintained in all the steps of the production process, and to propose a mechanized and automated method for large scale production of structural members having shapes and dimensions fulfilling each time the requirements of the project.

This and other objects and advantages, which will be more clearly understood hereinafter, are fulfilled according to the present invention by a method as defined in the appended claims.

BRIEF DESCRIPTION OF THE DRAWINGS

A description will now be given of a preferred but non-limiting embodiment of the invention, provided with reference to the appended drawings, in which:

FIG. 3 is a view in transverse section of a dry preform produced by the machine of FIG. 1;

FIG. 4 is partial perspective view of the final shape that the preform in FIG. 3 will assume following a process of polymerization of a resin infused in the preform; and FIG. 5 is a view in transverse section which illustrates the preform of FIG. 3, bent and inserted into a vacuum bag with a moulding fixture and with a charge of resin to be polymerized in an autoclave.

DETAILED DESCRIPTION OF THE PRESENTLT PREFERRED EMBODIMENTS

The example illustrated and described here refers to the production of a preform for a substantially oval structural member of a window frame for an aircraft. The reference to this possible field of application should of course not be in any way interpreted as limiting the scope of the patent.

Figure 1:
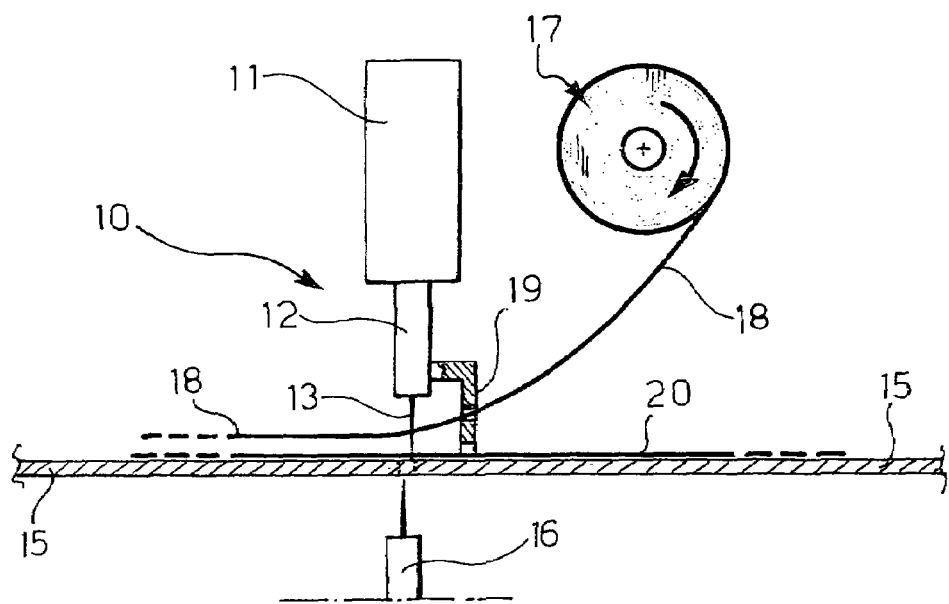
FIG. 1 is a view in vertical section which illustrates diagrammatically a machine for the manufacture of dry preforms according to the invention.

Referring initially to FIG. 1, the reference 10 indicates diagrammatically an automatic machine substantially similar to an embroidery machine. According to the steps which will be explained hereinafter, the machine 10 deposits tapes of continuous filaments of carbon fibre on a support sheet forming a dry preform constituted by layers of carbon fibre.

In its basic terms, the operating sequence of the machine 10 does not differ appreciably from the operating sequence of conventional embroidery machines, and will not therefore be described in detail in the continuation of the present description. For the production of the parts and the elements not illustrated in detail, reference may therefore be made to any embroidery machine of known type.

The machine 10 comprises a bridge-type support 11 on which is mounted an embroidery head 12 with an upper needle 13, a table 15 movable in a digitally controlled manner in a horizontal plane x-y, a bottom bobbin 16 which delivers a sewing thread 14, and a spool 17 from which is unwound a tape 18 of continuous filaments of carbon fibre. The tape 18 is guided by a guide 19 carried by the head 12.

Figure 2:
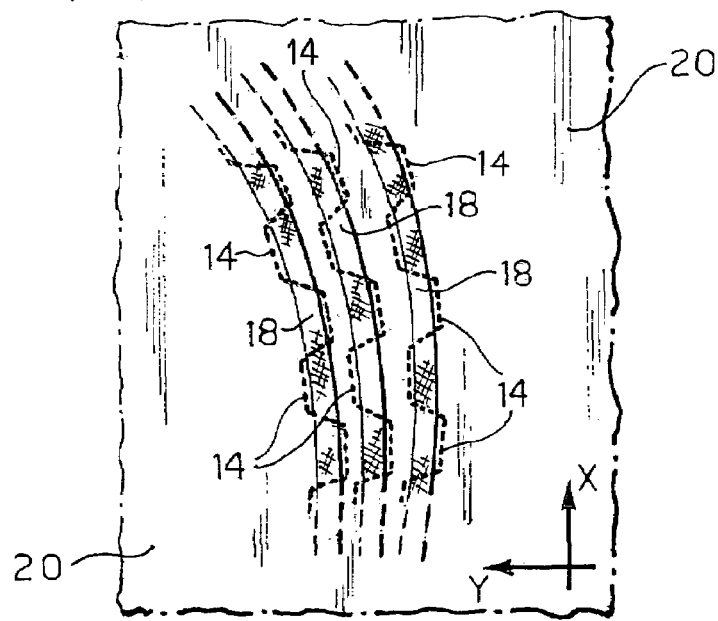
FIG. 2 is a view from above of a support sheet onto which are stitched tapes of continuous filaments of carbon fibre.

Following a scheme determined by a program, the machine 10 deposits and sews in a zigzag the thread 14 (FIG. 2), fixing the tape 18 on a support sheet 20 locked and spread out flat on the movable table 15, thus forming a first flat layer of dry carbon fibres (that is to say, not pre-impregnated with resin) which constitutes the development of one of the surfaces of the three-dimensional structural member to be manufactured.

The support sheet 20 is preferably a woven fabric of a material capable of being absorbed or integrated into the resin during the final step of polymerization in an autoclave, as described hereinafter. The line of stitching 14 is preferably made of a material selected from Kevlar, glass, polyester or carbon.

Once the first layer is completed, the machine proceeds cyclically, depositing and stitching further flat layers of carbon fibres on the first layer and then on the underlying layers deposited previously, until a three-dimensional solid (dry preform) is obtained, constituted by a succession of layers formed by tapes of continuous filaments of carbon fibre that are stitched together.

FIG. 3 illustrates a radial section of a dry preform 21 for the production of an oval window frame of an aircraft, which should then assume the final form having a substantially L-shaped section, as illustrated diagrammatically by 21a in FIG. 4. By depositing layers of carbon fibre of greater or lesser extent than the underlying ones, a preform having any desired shape can then be formed. In particular, it will be observed that locally thickened areas may be formed, such as those indicated by 22 in FIGS. 3 and 4.

The movements of the movable table 15 and of the head 12 of the embroidery machine are produced by the effect of commands imparted by a processing unit—typically a PLC or Programmable Logic Controller or a PC (Personal Computer)—which monitors the operation of the embroidery machine as a whole. Such movements are controlled and coordinated in such a manner that the carbon fibre tapes can be placed and stitched along paths of any shape and direction, also locally variable, creating areas with greater or lesser density of fibres (FIG. 2), in dependence on the level of the local tensions that the structural member must withstand under practical conditions. The relevant software which manages the operation of the machine may also command the movements of the movable members of the machine in such a manner as to produce different tension values in the various tapes of the same layer and/or between different layers, for example tensions increasing gradually towards the layers closer to the centre of curvature and therefore more strongly curved.

The dry preform 21 produced by the embroidery machine is a three-dimensional semi-manufactured product capable of being placed on a supporting and moulding fixture 23 equipping a vacuum bag 24 with a charge of resin 25 for polymerization in an autoclave. The dry preform is sufficiently flexible to be easily bent and locked between the positioning and supporting bars 23a-23d in order to immediately copy the shape thereof (FIG. 5). In this position, the fibres of the preform assume the final and optimum configuration (orientation, distribution, etc.) for withstanding the loads to which the member will be subjected during use.

Finally, temperature and pressure are applied in an autoclave to the assembly thus obtained in the vacuum bag, in such a manner as to bring about the infusion and polymerization of the resin in all the layers of the preform. The result of this operation is a composite structural member made of resin with continuous carbon fibres, distributed and oriented in an optimum manner in dependence on the geometry of the member and on the principal loads which it must withstand in use.

It is to be understood that the invention is not limited to the embodiments described and illustrated here, which are to be regarded as exemplary embodiments; the invention is instead capable of modification with respect to shape, dimensions and materials used. For example, the invention may also be implemented using glass fibres, aramid fibres, and the like.

What is claimed is:

1. A method for the manufacture of a dry preform having a predetermined three-dimensional shape, the preform being intended for reinforcing a composite structural member of an aircraft and comprising continuous reinforcing fibers held together by a line of stitching, the method comprising the steps of:
   depositing tapes of continuous filaments and stitching said tapes together to form an underlying layer of continuous reinforcing fibers;
   depositing further tapes of continuous filaments on said underlying layer of previously deposited and stitched continuous filaments, and stitching said further tapes to said underlying layer; and
   cyclically depositing and stitching still further tapes of continuous filaments on the previously deposited and stitched layers, until a three-dimensional dry preform is obtained, said dry preform constituted by a succession of layers each formed by tapes of continuous filaments stitched together, wherein the filaments in each layer are deposited so as to be oriented and distributed according to a predetermined scheme.

2. The method of claim 1, wherein said steps of depositing and stitching are carried out by a digitally controlled automatic machine substantially similar to an embroidery machine.

3. The method of claim 1, wherein each layer of fibers is stitched onto a substantially flat surface.

4. The method of claim 1, wherein a first layer of fibers is stitched on a flexible support sheet.

5. The method of claim 4, wherein the layers of fibers following the first layer are stitched onto underlying layers of fibers, deposited and stitched previously.

6. The method of claim 1, wherein in each layer, the fibers are stitched at least partly oriented and distributed such as to follow locally:
   a direction in which the structural member extends, and/or
   a direction according to the main stress which the structural member must withstand in use.

7. The method of claim 1, wherein the fibers are in the form of tapes of continuous filaments of carbon fibers, or glass fiber, or aramid fibers and the like.

8. The method of claim 4, wherein the support sheet comprises a woven fabric of a material capable of being absorbed or integrated in a resin matrix during a subsequent step of polymerization in an autoclave.

9. The method of claim 1, wherein the dry preform is intended to reinforce a composite structural member having a three-dimensional shape with curvatures in two different planes.

10. The method of claim 1, wherein the machine comprises:
    means for delivering continuous reinforcing fibers,
    stitching means for stitching the reinforcing fibers with a line of stitching on an underlying layer, and
    digitally controlled moving means for moving relative to one another the stitching means with respect to said underlying layer.

11. The method of claim 10, wherein the moving means comprise a table movable in a digitally controlled manner in a horizontal or vertical plane, on which table is fixed a flexible support sheet onto which is deposited and stitched a first layer of fibers.

12. The method of claim 1, wherein said steps of depositing and stitching are carried out simultaneously.

* * * * *